United States Patent
Xu et al.

(10) Patent No.: US 12,404,366 B2
(45) Date of Patent: Sep. 2, 2025

(54) SYSTEM AND METHOD FOR PREPARING POLYETHER AMINE BY CATALYTIC AMINATION OF POLYETHER DIOL

(71) Applicants: Zhejiang Huangma Technology Co., Ltd., Zhejiang (CN); Zhejiang Lukean Chemical Co., Ltd., Zhejiang (CN); Shangyu Huangma Surface Activated Reagent Research Institute Co., Ltd., Zhejiang (CN); Zhejiang Huangma Shangyi New Material Co., Ltd., Zhejiang (CN)

(72) Inventors: Yifan Xu, Shaoxing (CN); Majishi Wang, Shaoxing (CN); Jiang Yu, Shaoxing (CN); Minggui Song, Shaoxing (CN); Jun Wang, Shaoxing (CN)

(73) Assignees: Zhejiang Huangma Technology Co., Ltd., Shaoxing (CN); Zhejiang Lukean Chemical Co., Ltd., Shaoxing (CN); Shangyu Huangma Surface Activated Reagent Research Institute Co., Ltd., Shaoxing (CN); Zhejiang Huangma Shangyi New Material Co., Ltd., Shaoxing (CN)

( * ) Notice: Subject to any disclaimer, the term of this patent is extended or adjusted under 35 U.S.C. 154(b) by 401 days.

(21) Appl. No.: 18/071,608

(22) Filed: Nov. 29, 2022

(65) Prior Publication Data
US 2023/0167239 A1 Jun. 1, 2023

(30) Foreign Application Priority Data
Dec. 1, 2021 (CN) .......................... 202111459532.8

(51) Int. Cl.
*C08G 65/00* (2006.01)
(52) U.S. Cl.
CPC .................................. *C08G 65/00* (2013.01)

(58) Field of Classification Search
None
See application file for complete search history.

(56) References Cited

U.S. PATENT DOCUMENTS 3,847,992 A * 11/1974 Moss ................. C08G 18/4833
528/906

FOREIGN PATENT DOCUMENTS

| CN | 106750237 A | | 5/2017 | |
|---|---|---|---|---|
| CN | 111040148 A | | 4/2020 | |
| CN | 114247385 A | * | 3/2022 | ............... B01J 8/02 |

OTHER PUBLICATIONS

CN114247385 English Machine Translation, prepared Feb. 28, 2025. (Year: 2025).*
CN114247385 Espacenet Bibliographic data prepared Feb. 28, 2025. (Year: 2025).*

* cited by examiner

*Primary Examiner* — Christopher M Rodd

(57) ABSTRACT

Provided are a system and a method for preparing a polyether amine by catalytic amination of a polyether diol. The preparation method includes: filling a catalyst into the fixed bed reactor; pressurizing the internal pressure of the fixed bed reactor to 10~13 MPa by a hydrogen gas, and raising the temperature of the fixed bed reactor to 150~185° C.; adjusting the temperature of the multi-stage preheater so that the feeding temperature of a raw material reaches 125~135° C.; and simultaneously feeding a polyether diol, liquid ammonia and the hydrogen gas into the multi-stage preheater, and after mixing and preheating, introducing into the fixed bed reactor from the feed inlet of the fixed bed reactor for a continuous catalytic amination reaction. The total amine value of the polyether amine finally obtained by the present invention reaches 28~32 mgKOH/g, the color reaches 10~20, and it is colorless transparent liquid.

10 Claims, 1 Drawing Sheet

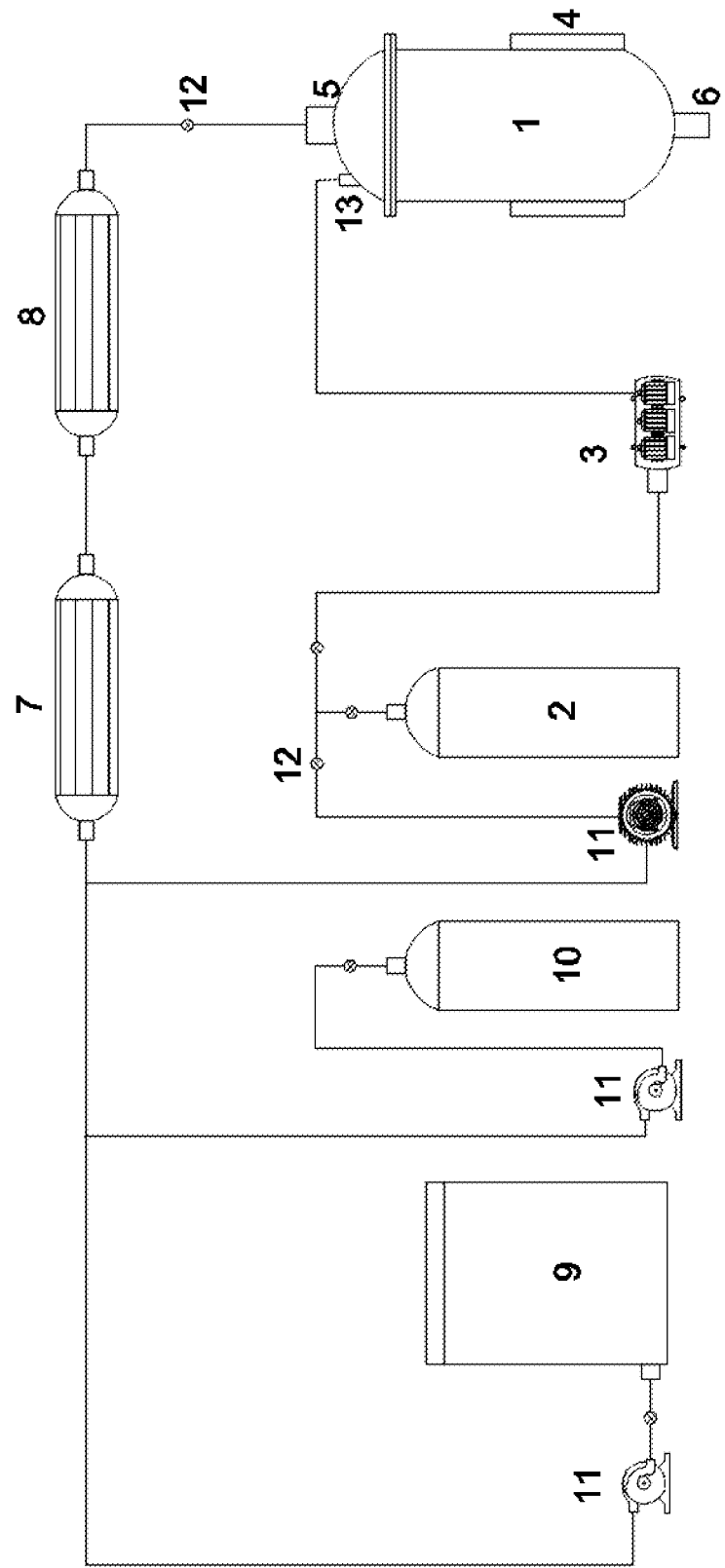

SYSTEM AND METHOD FOR PREPARING POLYETHER AMINE BY CATALYTIC AMINATION OF POLYETHER DIOL

CROSS-REFERENCE TO RELATED APPLICATION

The present application claims priority from Chinese Patent Application No. 202111459532.8 filed on Dec. 1, 2021, the contents of which are incorporated herein by reference in their entirety.

TECHNICAL FIELD

The present invention belongs to the technical field of fine chemical product synthesis, in particular to a system and a method for preparing a polyether amine by catalytic amination of a polyether diol.

BACKGROUND

A polyether amine (PEA) is a type of a compound with a soft polyether framework and a tail end capped with an amino group or an amine group (generally a secondary amine group, a primary amine group or a polyamine group containing active hydrogen). As a functional chemical, it has important applications in many fields such as chemical industry and medicine.

At present, synthesis methods of the polyether amine mainly include a catalytic amination method, a leaving group method, a hydrolysis method, an aminophenoxy method, an aminobutyrate method, a cyanoalkylation method and the like. Herein the catalytic amination method has the advantages of high utilization rate of raw materials, low environmental pollution, high conversion rate, good selectivity, easy separation and purification of synthetic products, and high purity of products and the like. In addition, this method only involves a one-step reaction, and the process is simple. It is the first choice for large-scale industrial continuous production of foreign chemical enterprises at present. At present, continuous production technologies of the polyether amine are mainly monopolized by Huntsman of the United States and BASF of Germany. Polyether amine products, especially a low-molecular weight polyether amine product, are relatively scarce in the domestic market and mainly rely on import, which to some extent restricts the wide applications of the polyether amine products in China. The production technology of the polyether amine of domestic enterprises basically adopts an intermittent process, it has more side reactions, and a polyether chain is easy to break, so that the product conversion rate is low, the product quality is inferior to the continuous process, and especially in the production of the low-molecular weight polyether amine, the product quality has a significant gap with the foreign production technology and product quality.

The polyether amine is a polymer with both lipophilicity and certain hydrophilicity, it may be used as an emulsifier, an adhesive sticker and a corrosion inhibitor; and it may also be used as an active dispersant. Its advantage is soluble in water, and has the properties of a surfactant which may adjust various resin types. It solves the disadvantages of a traditional small-molecular polyamine curing agent such as high toxicity and volatility, has the functions such as curing, toughening and anti-yellowing, and has a very broad application prospect. An existing technology for producing the polyether amine also uses the intermittent process, and there is still much room for improvement in the conversion rate and quality of the product. If a more appropriate process may be developed, it is bound to have the great application value and economic benefits, and it may also provide a new guidance direction for the research and development and the production of other polyether amines, and get rid of the restrictions imposed by foreign countries on the polyether amine market in China.

SUMMARY

In view of problems in an existing technology, the present invention provides a system and a method for preparing a polyether amine by catalytic amination of a polyether diol, and this method is simple, efficient, economical and practical. Technical schemes of the present invention are as follows.

In a first aspect, the present invention provides a system for preparing a polyether amine by catalytic amination of a polyether diol, including a fixed bed reactor, herein an air inlet of the fixed bed reactor is communicated with a hydrogen tank; the fixed bed reactor is provided with a heating furnace; and a top portion of the fixed bed reactor is provided with a feed inlet, a bottom portion is provided with a discharge outlet, the feed inlet is communicated with a multi-stage preheater, and the multi-stage preheater is connected with a raw material tank.

Further, a pipeline connecting the fixed bed reactor with the hydrogen tank is provided with an air compressor.

Preferably, the multi-stage preheater includes a first-stage preheater and a second-stage preheater connected with each other, and the second-stage preheater is communicated with the feed inlet of the fixed bed reactor.

Further, a pipeline connecting the multi-stage preheater with the raw material tank is provided with a raw material booster pump.

In a second aspect, the present invention provides a method for preparing a polyether amine by catalytic amination of a polyether diol, which adopts the above system. The method includes: filling a catalyst into a fixed bed reactor; pressurizing the internal pressure of the fixed bed reactor to 10~13 MPa by a hydrogen gas, and raising the temperature of the fixed bed reactor to 150~185° C.; adjusting the temperature of a multi-stage preheater so that the feeding temperature of a raw material reaches 125~135° C.; and simultaneously feeding a polyether diol, liquid ammonia and the hydrogen gas into the multi-stage preheater, and after mixing and preheating, introducing into the fixed bed reactor from a feed inlet of the fixed bed reactor for a continuous catalytic amination reaction, herein the feeding flow rate of the polyether diol is adjusted to 0.2~0.6 h$^{-1}$, the feeding flow rate of the liquid ammonia is 0.3~0.8 h$^{-1}$, and the feeding flow rate of the hydrogen gas is 0.2~0.5 h$^{-1}$, a finished product after the reaction is discharged and received from a discharge outlet of the fixed bed reactor.

Further, while the multi-stage preheater includes the first-stage preheater and the second-stage preheater connected to each other, the adjustment temperatures of the first-stage preheater and the second-stage preheater are both 140~150° C.

Further, the catalyst is a cordierite and $\gamma$—$Al_2O_3$ supported noble metal and lanthanide metal three-way catalyst, and a preparation method includes the following steps:

Step 1, using a cordierite as a first support, using $\gamma$—$Al_2O_3$ as a second support, and after uniformly mixing $\gamma$—$Al_2O_3$, a lanthanide metal oxide and deionized water of which the mole ratio is 1:(1.2~1.4):(2~2.2), coating on the cordierite;

Step 2: impregnating the coated cordierite with 68%~70% $H_2PtCl_6 \cdot 6H_2O$, 72%~75% $PdCl_2$ and 85%~87% $RhCl_3 \cdot 3H_2O$ aqueous solution in mass concentration successively by an equivalent-volume impregnation method;

Step 3: taking out the cordierite after impregnation treatment and roasting; and Step 4, performing $H_2$ reduction on a roasted catalyst precursor; and after the reduction, using $N_2$ for purging, cooling, to obtain the catalyst.

Further, the lanthanide metal oxide includes: at least one of oxides of Ce, La, Ba and Zr.

Further, the control parameters of the impregnation treatment are as follows: standing treatment is performed at a room temperature for 1.5~2.5 h.

Further, the control parameters of the roasting treatment are as follows: the roasting temperature is 300~350° C., and the roasting time is 8~12 h.

Further, the control parameters of the $H_2$ reduction are as follows: the temperature is raised to 300~400° C. under a condition of $H_2$ purging, and the temperature is kept for 2~4 h.

A reaction equation involved in the present invention is shown in Formula (1).

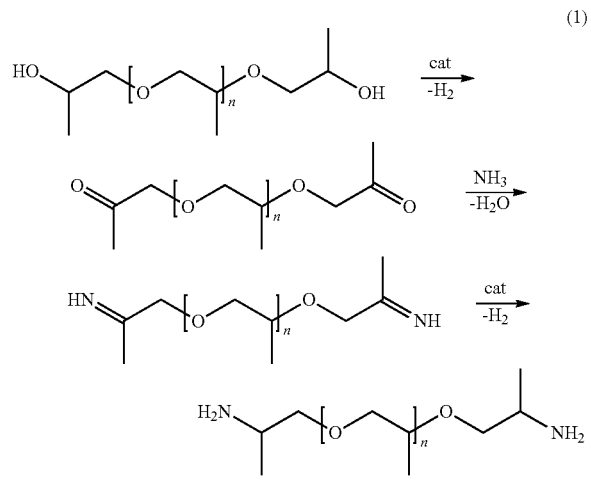

In the fixed bed reactor of the present invention, the raw materials are heated, and then mixed and fed. Under a certain temperature and pressure, the catalytic amination reaction is performed, the primary amine conversion rate reaches 95%~99%, the total amine value reaches 28~32 mgKOH/g, the color is 10~20, and it is colorless transparent liquid.

Compared with the existing technology, the present invention has the following advantages.

1. The present invention uses the fixed bed reactor as a main reaction device, and by additionally arranging auxiliary devices such as pressurization, raw material preheating, and feeding amount adjustment in the reactor to prepare the polyether amine, the whole technological process is simple and easy to control, the conversion rate is high, and the disadvantages, such as frequent catalyst replacement, unstable reaction pressure and excessive by-products, of an intermittent reaction kettle are solved.

2. The present invention adopts a special catalyst for preparing the polyether amine by the catalytic amination of the polyether diol, and it has the advantages of high conversion efficiency, long service life, low cost and environmental protection, and conforms to the future market prospect.

3. The total amine value of the polyether amine finally obtained by the present invention reaches 28~32 mgKOH/g, the color reaches 10~20, and it is the colorless transparent liquid.

BRIEF DESCRIPTION OF THE DRAWINGS

The sole FIGURE is a structure schematic diagram of a system for preparing a polyether amine by catalytic amination of a polyether diol according to the present invention, herein, 1. Fixed bed reactor, 2. Hydrogen tank, 3. Air compressor, 4. Heating furnace, 5. Fixed bed reactor feed inlet, 6. Fixed bed reactor discharge outlet, 7. First-stage preheater, 8. Second-stage preheater, 9. Polyether diol raw material tank, 10. Liquid ammonia tank, 11. Raw material pump, 12. Control valve on pipeline, and 13. Air port.

DETAILED DESCRIPTION OF THE EMBODIMENTS

In the description of the present invention, it should be noted that those without specific conditions in embodiments are performed according to conventional conditions or conditions recommended by manufacturers. Reagents or instruments used that do not indicate the manufacturers are all conventional products that may be purchased and obtained from the market.

The present invention is further described in detail in combination with the specific embodiments, to help those skilled in the art have more complete, accurate and in-depth understanding of inventive concepts and technical schemes of the present invention. A scope of protection of the present invention includes but is not limited to the following embodiments, and any modifications made to details and forms of the technical schemes of the present invention without deviating from the spirit and scope of the present application fall within the scope of protection of the present invention.

As shown in the sole FIGURE, the specific embodiment of the present invention provides a system for preparing a polyether amine by catalytic amination of a polyether diol, including a fixed bed reactor 1, herein an air inlet of the fixed bed reactor 1 is communicated with a hydrogen tank 2 by a pipeline, and the pipeline is provided with an air compressor 3; the fixed bed reactor 1 is provided with a heating furnace 4; a top portion of the fixed bed reactor 1 is provided with a feed inlet 5, a bottom portion is provided with a discharge outlet 6, the fixed bed reactor feed inlet 5 is communicated with a multi-stage preheater, and the multi-stage preheater includes a first-stage preheater 7 and a second-stage preheater 8 connected with each other, herein the first-stage preheater 7 is connected with a raw material tank, the raw material tank includes a polyether diol raw material tank 9, a liquid ammonia tank 10, and the hydrogen tank 2, and a pipeline connecting the raw material tank with the first-stage preheater 7 is provided with a raw material pump 11, herein a liquid pump is used for pumping liquid, and an air pump is used for pumping a gas; and the second-stage preheater 8 is communicated with the fixed bed reactor feed inlet 5. The fixed bed reactor 1 is further provided with an air port 13 for air intake and air suction effects. Each connecting pipeline is provided with a control valve 12.

In this embodiment, the process of preparing the polyether amine is gradually transited from a laboratory small scale test to a pilot scale test and then to workshop production. The specifications of the fixed bed reactor used are: 5 L, 10 L and 100 L.

In this embodiment, before the polyether amine is prepared, a cordierite and $\gamma$—$Al_2O_3$ supported noble metal and lanthanide metal three-way catalyst is firstly prepared by the following methods, and it is specifically as follows:

Step 1, a cordierite is used as a first support, $\gamma$—$Al_2O_3$ is used as a second support, and after $\gamma$—$Al_2O_3$, a lanthanide metal oxide and deionized water of which the mole ratio is 1:1.3:2.1 are mixed uniformly, it is coated on the cordierite; and the lanthanide metal oxide includes at least one of oxides of Ce, La, Ba and Zr.

Step 2, the coated cordierite is impregnated with 68% $H_2PtCl_6·6H_2O$, 72% $PdCl_2$ and 85% $RhCl_3·3H_2O$ aqueous solution in mass concentration successively by an equivalent-volume impregnation method.

Step 3, After impregnation treatment, the cordierite is taken out and roasting treatment is performed, and the control parameters of the roasting treatment are as follows: the roasting temperature is 300~350° C., and the roasting time 8~12 h.

Step 4, $H_2$ reduction is performed on a roasted catalyst precursor, and the control parameters of the $H_2$ reduction are as follows: the temperature is raised to 300~400° C. under a condition of $H_2$ purging, and the temperature is kept for 2~4 h. After the reduction, $N_2$ is used for purging, and it is cooled, to obtain the catalyst.

The present invention is further described in detail in the following specific cases which are gradually expanded to the workshop production by the laboratory small scale test.

Embodiment 1

This embodiment provides a laboratory small scale test preparation process of a polyether amine, and it is specifically as follows:

A lanthanide metal oxide used in a catalyst of this embodiment is a compound of $La_2O_3$ and $CeO_2$ in a mass ratio of 1:1; 1 kg of the catalyst is filled in a fixed bed reactor, the internal pressure of the fixed bed reactor is pressurized to 12 MPa by a hydrogen gas, and the temperature of the fixed bed reactor is raised to 185° C.; the flow rate of a polyether raw material pump is adjusted to 0.2 $h^{-1}$, the flow rate of liquid ammonia is 0.3 $h^{-1}$ and the flow rate of the hydrogen gas is 0.2 $h^{-1}$, it is mixed and preheated for feeding, so that its temperature at a feed inlet of the reactor reaches 130° C., the temperature of a reactor system is 185° C., the reaction pressure is maintained at 12 Mpa, it is stably reacted for 8 h, and discharged for product dehydration post-treatment, and it is detected that the total amine value is 32 mgKOH/g, the primary amine conversion rate is 98.9%, the moisture is 0.17, the color is 13, and liquid is colorless and transparent.

Embodiment 2

This embodiment provides a laboratory small scale test preparation process of a polyether amine, and it is specifically as follows:

A lanthanide metal oxide used in a catalyst of this embodiment is a compound of $La_2O_3$ and $BaO_2$ in a mass ratio of 1:1; 1 kg of the catalyst is filled in a fixed bed reactor, the internal pressure of the fixed bed reactor is pressurized to 13 MPa by a hydrogen gas, and the temperature of the fixed bed reactor is raised to 170° C.; the flow rate of a polyether raw material pump is adjusted to 0.3 $h^{-1}$, the flow rate of liquid ammonia is 0.3 $h^{-1}$ and the flow rate of the hydrogen gas is 0.2 $h^{-1}$, it is mixed and preheated for feeding, so that its temperature at a feed inlet of the reactor reaches 130° C., the temperature of a reactor system is 170° C., the reaction pressure is maintained at 13 Mpa, it is stably reacted for 8 h, and discharged for product dehydration post-treatment, and it is detected that the total amine value is 28 mgKOH/g, the primary amine conversion rate is 96.7%, the moisture is 0.18, the color is 14, and liquid is colorless and transparent.

Embodiment 3

This embodiment provides a laboratory small scale test preparation process of a polyether amine, and it is specifically as follows.

A lanthanide metal oxide used in a catalyst of this embodiment is a compound of $CeO_2$ and $ZrO_2$ in a mass ratio of 1:1; 1 kg of the catalyst is filled in a fixed bed reactor, the internal pressure of the fixed bed reactor is pressurized to 10 MPa by a hydrogen gas, and the temperature of the fixed bed reactor is raised to 150° C.; the flow rate of a polyether raw material pump is adjusted to 0.2 $h^{-1}$, the flow rate of liquid ammonia is 0.4 $h^{-1}$ and the flow rate of the hydrogen gas is 0.3 $h^{-1}$, it is mixed and preheated for feeding, so that its temperature at a feed inlet of the reactor reaches 130° C., the temperature of a reactor system is 150° C., the reaction pressure is maintained at 10 Mpa, it is stably reacted for 6 h, and discharged for product dehydration post-treatment, and it is detected that the total amine value is 28.5 mgKOH/g, the primary amine conversion rate is 97.0%, the moisture is 0.18, the color is 18, and liquid is colorless and transparent.

Embodiment 4

This embodiment provides a pilot scale-up test preparation process of a polyether amine, and it is specifically as follows.

A catalyst the same as in Embodiment 1 is used, 10 kg of the catalyst is filled in a fixed bed reactor of a laboratory pilot scale-up device, the internal pressure of the fixed bed reactor is pressurized to 10 MPa by a hydrogen gas, and the temperature of the fixed bed reactor is raised to 150° C.; the flow rate of a polyether raw material pump is adjusted to 0.4 $h^{-1}$, the flow rate of liquid ammonia is 0.4 $h^{-1}$ and the flow rate of the hydrogen gas is 0.3 $h^{-1}$, it is mixed and preheated for feeding, so that its temperature at a feed inlet of the reactor reaches 130° C., the temperature of a reactor system is 150° C., the reaction pressure is maintained at 10 Mpa, it is stably reacted for 6 h, and discharged for product dehydration post-treatment, and it is detected that the total amine value is 29 mgKOH/g, the primary amine conversion rate is 97.0%, the moisture is 0.25, the color is 20, and liquid is colorless and transparent.

Embodiment 5

This embodiment provides a certain batch workshop production process of a polyether amine, and it is specifically as follows.

A catalyst the same as in Embodiment 1 is used, 40 kg of the catalyst is filled in a fixed bed reactor of a workshop scale-up device, the internal pressure of the fixed bed reactor is pressurized to 10 MPa by a hydrogen gas, and the temperature of the fixed bed reactor is raised to 150° C.; the flow rate of a polyether raw material pump is adjusted to 0.6 $h^{-1}$, the flow rate of liquid ammonia is 0.8 $h^{-1}$ and the flow rate of the hydrogen gas is 0.5 $h^{-1}$, it is mixed and preheated for feeding, so that its temperature at a feed inlet of the reactor reaches 130° C., the temperature of a reactor system is 150° C., the reaction pressure is maintained at 10 Mpa, it is stably reacted for 6 h, and discharged for product dehydration post-treatment, and it is detected that the total amine value is 29.5 mgKOH/g, the primary amine conversion rate is 97.5%, the moisture is 0.20, the color is 19, and liquid is colorless and transparent.

Embodiment 6

This embodiment provides a certain batch workshop production process of a polyether amine, and it is specifically as follows.

A catalyst the same as in Embodiment 1 is used, 40 kg of the catalyst is filled in a fixed bed reactor of a workshop scale-up device, the internal pressure of the fixed bed reactor is pressurized to 10 MPa by a hydrogen gas, and the temperature of the fixed bed reactor is raised to 150° C.; the flow rate of a polyether raw material pump is adjusted to 0.6 $h^{-1}$, the flow rate of liquid ammonia is 0.8 $h^{-1}$ and the flow rate of the hydrogen gas is 0.5 $h^{-1}$, it is mixed and preheated for feeding, so that its temperature at a feed inlet of the reactor reaches 130° C., the temperature of a reactor system is 150° C., the reaction pressure is maintained at 10 Mpa, it is discharged for product dehydration post-treatment every 10 h of a stable reaction, it is continuously reacted for 1000 h, sampled for 100 times and detected that the total amine value is 28~30 mgKOH/g, the primary amine conversion rate is 95~98%, the moisture is <0.30, the color is <14, and liquid is colorless to yellowish transparent. It is indicated that the catalyst still has the good catalytic ability after 1000 h of the continuous reaction.

Contrast Example 1

This contrast example provides a technology for preparing a polyether amine by using an existing catalyst, and it is specifically as follows.

A Ni—Cu—Cr—La quaternary catalyst (commercially available) from Huntsman Company of the United States is used, 1 kg of the catalyst is filled in a fixed bed reactor the same as in Embodiment 1, and the experimental conditions are the same as in Embodiment 1. After 8 h of a stable reaction, it is discharged for product post-treatment, and it is detected that the total amine value is 26 mgKOH/g, the primary amine conversion rate is 94.9%, the moisture is 0.17, and the color is 57.

Contrast Example 2

This contrast example provides a technology for preparing a polyether amine by using another existing catalyst, and it is specifically as follows.

An existing ZSM-11 molecular sieve catalyst is used, 1 kg of the catalyst is filled in a fixed bed reactor the same as in Embodiment 1, and the experimental conditions are the same as in Embodiment 1. After 8 h of a stable reaction, it is discharged for product post-treatment, and it is detected that the total amine value is 24 mgKOH/g, the primary amine conversion rate is 93.2%, the moisture is 0.56, and the color is 77.

Contrast Example 3

This contrast example provides a batch-type preparation technology for a polyether amine, and it is specifically as follows.

A catalyst the same as in Embodiment 1 is used, 70 g of the catalyst is filled in an intermittent reaction kettle, 150 g of a fresh polyether and 150 g of liquid ammonia are added, and 2 Mpa of fresh $H_2$ is fed. The temperature of a reactor system is slowly raised to 180° C., the reaction pressure is raised to 12 Mpa, it is discharged for product post-treatment after 8 h of a stable reaction, and it is detected that the total amine value is 30 mgKOH/g, the primary amine conversion rate is 96.7%, the moisture is 0.15, and the color is 14.

TABLE 1

Result data of embodiments and contrast examples

| | Total amine value (mgKOH/g) | Primary amine conversion rate (%) | Moisture (%) | Color (Pt—Co) |
|---|---|---|---|---|
| Embodiment 1 | 32 | 98.9 | 0.17 | 13 |
| Embodiment 2 | 28 | 96.7 | 0.18 | 14 |
| Embodiment 3 | 28.5 | 97.0 | 0.18 | 18 |
| Embodiment 4 | 29 | 97.0 | 0.25 | 20 |
| Embodiment 5 | 29.5 | 97.5 | 0.20 | 19 |
| Embodiment 6 | 28~30 | 95~98 | <0.30 | <14 |
| Contrast example 1 | 26 | 94.9 | 0.17 | 57 |
| Contrast example 2 | 24 | 93.2 | 0.56 | 77 |
| Contrast example 3 | 30 | 96.7 | 0.15 | 14 |
| Product of Huntsman, USA | 25.5~29.0 | ≥95 | ≤0.50 | ≤50 |

Reaction Evaluation of Embodiments 1~6 and Contrast Examples

It may be seen from the data in Table 1 that the cordierite and γ—$Al_2O_3$ supported noble metal and lanthanide metal three-way catalyst prepared in the present invention, and the continuous reaction system using the fixed bed reactor as a main body are used in combination with the specific process conditions and operation processes, the conversion rate of the raw material polyether diol is the highest, the total amine value may also be stabilized in an appropriate range, the color is in an appropriate index, and the service life of the catalyst reaches expectation, it is not inferior to the product of Huntsman, USA.

The above embodiments only express several implementation modes of the present invention, and its description is more specific and detailed, but it may not be understood as limitation to a scope of the present invention patent. It should be pointed out that for those of ordinary skill in the art, a plurality of modifications and improvements may be made without departing from the concept of the present invention, and these all belong to a scope of protection of the present invention. Therefore, the scope of protection of the present invention patent shall be subject to the appended claims.

What is claimed is:

1. A method for preparing a polyether amine by catalytic amination of a polyether diol, wherein a system for preparing the polyether amine by the catalytic amination of the polyether diol is used, and the system comprises a fixed bed reactor, an air inlet of the fixed bed reactor is communicated with a hydrogen tank; the fixed bed reactor is provided with a heating furnace; a top portion of the fixed bed reactor is provided with a feed inlet, a bottom portion is provided with a discharge outlet, the feed inlet is communicated with a multi-stage preheater, and the multi-stage preheater is connected with a raw material tank; and the method comprises: filling a catalyst into the fixed bed reactor; pressurizing the internal pressure of the fixed bed reactor to 10~13 MPa by a hydrogen gas, and raising the temperature of the fixed bed reactor to 150~185° C.; adjusting the temperature of the multi-stage preheater so that the feeding temperature of a raw material reaches 125~135° C.; and simultaneously feeding a polyether diol, liquid ammonia and the hydrogen gas into the multi-stage preheater, and after mixing and preheating, introducing into the fixed bed reactor from the feed inlet of the fixed bed reactor for a continuous catalytic amination reaction, wherein a finished product after the reaction is discharged and received from the discharge outlet of the fixed bed reactor.

2. The method for preparing the polyether amine by the catalytic amination of the polyether diol according to claim 1, wherein a pipeline connecting the fixed bed reactor with the hydrogen tank is provided with an air compressor.

3. The method for preparing the polyether amine by the catalytic amination of the polyether diol according to claim 1, wherein the multi-stage preheater comprises a first-stage preheater and a second-stage preheater connected with each other, and the second-stage preheater is communicated with the feed inlet of the fixed bed reactor.

4. The method for preparing the polyether amine by the catalytic amination of the polyether diol according to claim 3, wherein a pipeline connecting the multi-stage preheater with the raw material tank is provided with a raw material booster pump.

5. The method for preparing the polyether amine by the catalytic amination of the polyether diol according to claim 3, wherein the adjustment temperatures of the first-stage preheater and the second-stage preheater are both 140~150° C.

6. The method for preparing the polyether amine by the catalytic amination of the polyether diol according to claim 1, wherein the catalyst is a cordierite and $\gamma$—$Al_2O_3$ supported noble metal and lanthanide metal three-way catalyst, and a preparation method comprises the following steps:

Step 1, using a cordierite as a first support, using $\gamma$—$Al_2O_3$ as a second support, and after uniformly mixing $\gamma$—$Al_2O_3$, a lanthanide metal oxide and deionized water of which the mole ratio is 1:(1.2~1.4):(2~2.2), coating on the cordierite;

Step 2: impregnating the coated cordierite with 68%~70% $H_2PtCl_6 \cdot 6H_2O$, 72%~75% $PdCl_2$ and 85%~87% $RhCl_3 \cdot 3H_2O$ aqueous solution in mass concentration successively by an equivalent-volume impregnation method;

Step 3: taking out the cordierite after impregnation treatment and roasting; and Step 4, performing $H_2$ reduction on a roasted catalyst precursor; and after the reduction, using $N_2$ for purging, cooling, to obtain the catalyst.

7. The method for preparing the polyether amine by the catalytic amination of the polyether diol according to claim 6, wherein the lanthanide metal oxide comprises: at least one of oxides of Ce, La, Ba and Zr.

8. The method for preparing the polyether amine by the catalytic amination of the polyether diol according to claim 6, wherein the control parameters of the impregnation treatment are as follows: standing treatment is performed at a room temperature for 1.5~2.5 h.

9. The method for preparing the polyether amine by the catalytic amination of the polyether diol according to claim 6, wherein the control parameters of the roasting treatment are as follows: the roasting temperature is 300~350° C., and the roasting time is 8~12 h.

10. The method for preparing the polyether amine by the catalytic amination of the polyether diol according to claim 6, wherein the control parameters of the $H_2$ reduction are as follows: the temperature is raised to 300~400° C. under a condition of $H_2$ purging, and the temperature is kept for 2~4 h.

* * * * *